(12) United States Patent
Mishima et al.

(10) Patent No.: US 8,224,111 B2
(45) Date of Patent: Jul. 17, 2012

(54) METHOD OF RESTORING DEGRADED IMAGE, APPARATUS FOR RESTORING DEGRADED IMAGE, AND COMPUTER PROGRAM PRODUCT

(75) Inventors: Nao Mishima, Tokyo (JP); Kenzo Isogawa, Kanagawa (JP); Masahiro Baba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 673 days.

(21) Appl. No.: 12/408,861

(22) Filed: Mar. 23, 2009

(65) Prior Publication Data

US 2010/0061651 A1 Mar. 11, 2010

(30) Foreign Application Priority Data

Sep. 5, 2008 (JP) ................................ 2008-228555

(51) Int. Cl.
*G06K 9/40* (2006.01)

(52) U.S. Cl. ........................................ 382/265; 382/275

(58) Field of Classification Search .................. 382/254, 382/274, 275, 260, 305, 312, 265; 358/463; 345/611, 615, 647

See application file for complete search history.

(56) References Cited

U.S. PATENT DOCUMENTS

| 5,490,094 | A | * | 2/1996 | Heimburger et al. | 348/607 |
| 5,550,935 | A | * | 8/1996 | Erdem et al. | 382/260 |
| 5,790,709 | A | * | 8/1998 | Kopeika et al. | 382/254 |
| 6,154,574 | A | * | 11/2000 | Paik et al. | 382/255 |
| 7,636,488 | B2 | * | 12/2009 | Fiete | 382/260 |

FOREIGN PATENT DOCUMENTS

JP 2002-300459 10/2002

OTHER PUBLICATIONS

Mark R. Banham, et al, "Digital Image Restoration," IEEE Signal Processing Magazine, pp. 24-41, 1997.
Jan Biemond, et al, "Iterative Methods for Image Deblurring," Proceedings of the IEEE, vol. 78, Issue 5, pp. 586-883, May 1990.

* cited by examiner

*Primary Examiner* — Kanjibhai Patel
(74) *Attorney, Agent, or Firm* — Turocy & Watson, LLP

(57) ABSTRACT

A degraded-image restoration method includes inputting a degraded image degraded by a predetermined degradation process; reading from a storage unit a filter coefficient in a filtering process of restoring the degraded image, in which an iteration formula for minimizing a square error between the degraded image and an image obtained by degrading a restored image by the degradation process is expanded corresponding to a predetermined number of iterations; and performing the filtering process using the filter coefficient with respect to the degraded image to obtain a restored image of the degraded image. Accordingly, a throughput in an apparatus that restores the degraded image can be reduced, thereby obtaining a preferable restored image.

6 Claims, 7 Drawing Sheets

METHOD OF RESTORING DEGRADED IMAGE, APPARATUS FOR RESTORING DEGRADED IMAGE, AND COMPUTER PROGRAM PRODUCT

CROSS-REFERENCE TO RELATED APPLICATIONS

This application is based upon and claims the benefit of priority from the prior Japanese Patent Application No. 2008-228555, filed on Sep. 5, 2008; the entire contents of which are incorporated herein by reference.

BACKGROUND OF THE INVENTION

1. Field of the Invention

The present invention relates to a method of restoring degraded image, an apparatus for restoring degraded image, and a computer program product.

2. Description of the Related Art

Conventionally, as an image restoration technique for restoring a degraded image, there are a method of using a generalized inverse filter and the Richardson-Lucy method (also referred to as the Landweber method) (see M. R. Banham and A. K. Katsaggelos, "Digital Image Restoration", IEEE Signal Processing Magazine, pp. 24-41, 1997). In both methods, a desired restored image is determined so that a square error between an image degraded by a degradation process and an input image becomes the smallest, assuming that the degradation process is known.

The generalized inverse filter calculates an inverse matrix as a result of solving the condition that square error becomes the smallest. Because the calculation can be difficult as it is, discrete Fourier transform is performed to execute calculation in a frequency space, and the calculation is returned to a real space again. This is because the inverse matrix operation becomes division in the frequency space.

According to the Richardson-Lucy method, a restored image having the smallest square error is obtained by gradual convergence from an initial solution to a real solution by an iteration method. For example, in JP-A 2002-300459 (KOKAI), a memory-saving configuration is shown such that a local convolution operation is performed based on the Richardson-Lucy method, thereby making it unnecessary to perform a large-scale matrix operation.

The generalized inverse filter can obtain a restored image by one processing; however, the large-scale matrix operation is required, thereby causing a problem that a calculation amount is large. Further, because the Richardson-Lucy method is an iterative solution, iteration of from several times to several tens of times is required to obtain a desired restoration result. The same applies to an image restoring apparatus described in JP-A 2002-300459 (KOKAI), which is based on the Richardson-Lucy method. As the number of iterations increases, the calculation amount also increases, thereby making it difficult to realize the generalized inverse filter by an apparatus or the like.

SUMMARY OF THE INVENTION

According to one aspect of the present invention, a degraded-image restoration method includes inputting a degraded image degraded by a predetermined degradation process; reading from a storage unit a filter coefficient in a filtering process of restoring the degraded image, in which an iteration formula for minimizing a square error between the degraded image and an image obtained by degrading a restored image by the degradation process is expanded corresponding to a predetermined number of iterations; and performing the filtering process using the filter coefficient with respect to the degraded image to obtain a restored image of the degraded image.

According to another aspect of the present invention, a degraded-image restoring apparatus includes an image input unit that inputs a degraded image degraded by a predetermined degradation process; a storage unit that stores a filter coefficient in a filtering process of restoring the degraded image, in which an iteration formula for minimizing a square error between the degraded image and an image obtained by degrading a restored image by the degradation process is expanded corresponding to a predetermined number of iterations; and a restored-image obtaining unit that obtains the restored image of the degraded image by performing the filtering process using the filter coefficient with respect to the degraded image.

A computer program product according to still another aspect of the present invention causes a computer to perform the method according to the present invention.

DETAILED DESCRIPTION OF THE INVENTION

Exemplary embodiments of the present invention will be explained below with reference to the accompanying drawings.

Figure 1:
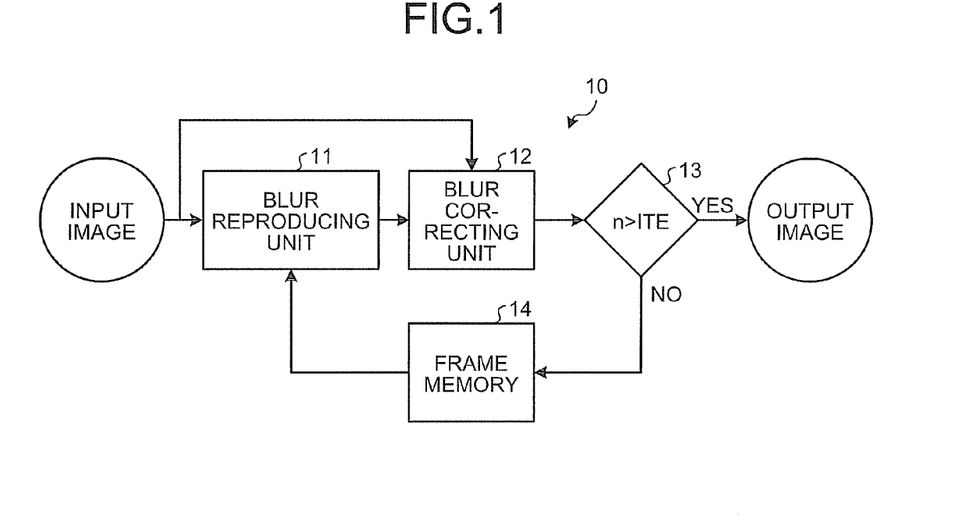
FIG. 1 is a block diagram of a functional configuration of an apparatus that restores a degraded image according to the Richardson-Lucy method.

The degraded-image restoring apparatus 10 in FIG. 1 has a function of correcting "blur", which is degradation of an image. The degraded-image restoring apparatus 10 includes a blur reproducing unit 11, a blur correcting unit 12, a determining unit 13, and a frame memory 14.

The blur reproducing unit 11 applies predetermined image degradation to an input image. The predetermined image degradation is, for example, a change in the image due to lens blur of a camera or the like. The change in the image by the lens blur of the camera is expressed by, for example, a point spread function (hereinafter, "PSF").

Figure 2:
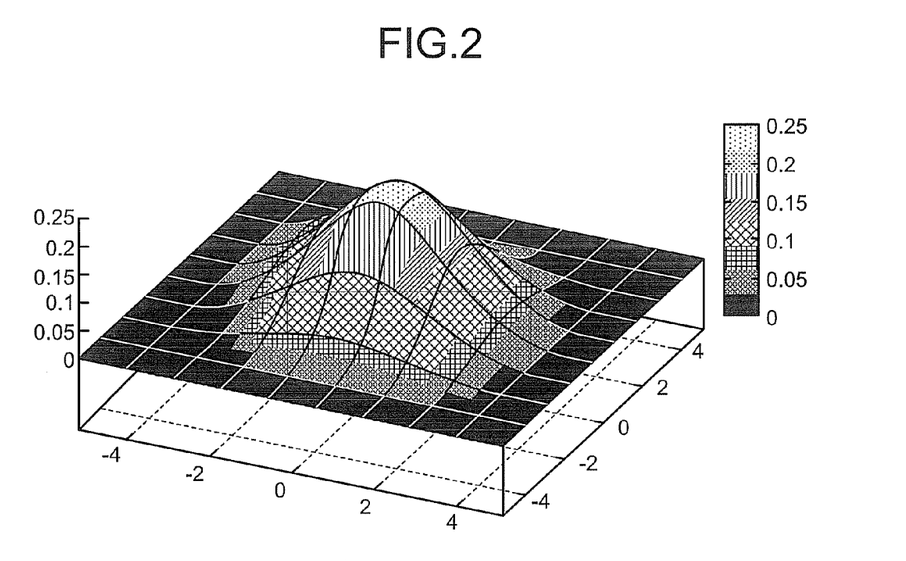
FIG. 2 is a diagram of a PSF approximately expressed by a Gaussian function.

FIG. 2 depicts the PSF approximately expressed by a Gaussian function. The PSF by the Gaussian function is expressed by the following equation (1).

$$h(i, j) = \frac{1}{Q} \exp\left(-\frac{i^2 + j^2}{2\sigma^2}\right) \quad (1)$$

$$Q = \sum_{i=-r,j=-r}^{i \leq r, j \leq r} \exp\left(-\frac{i^2 + j^2}{2\sigma^2}\right)$$

where Q denotes a normalizing constant, natural number $r \geq 1$ is a radius of the PSF, and $\sigma > 0$ denotes a standard deviation of the Gaussian function and indicates a size of the blur.

The blur correcting unit 12 performs correction so that the square error between the image applied with degradation by the blur reproducing unit 11 and the input image becomes the smallest. The determining unit 13 determines whether reproduction of the blur by the blur reproducing unit 11 and correction of the blur by the blur correcting unit 12 exceed a predetermined number of iterations. When the reproduction and correction of the blur do not exceed the predetermined number of iterations, the image with blur being corrected by the blur correcting unit 12 is stored in the frame memory 14. When the reproduction and correction of the blur exceed the predetermined number of iterations, the image with blur being corrected by the blur correcting unit 12 is output as a restored image.

In the present embodiment, the degradation process of the image is realized by a model to correct the blur. Modeling of the degradation process of the image and the correction of the blur by the degradation process are explained below.

The input image is assumed as a column vector, and the input image is arranged in vector, which is assumed as y. For example, when pixel values in a horizontal direction of the image are shifted by one pixel each in a vertical direction and connected sequentially, the image can be expressed by the column vector. When it is assumed that the size of the image is $M_1$ pixels horizontal by $M_2$ pixels vertical, y is the column vector having a size of $M_1 \times M_2$.

The restored image, which is an output of the degraded-image restoring apparatus 10, is expressed as x. x is also the column vector having a size of $M_1 \times M_2$. If it is considered that an input image is obtained by degrading the restored image and superimposing a noise thereon, the degradation process of the image can be modeled according to the following equation (2).

$$y = Hx + n \quad (2)$$

where H is a point response function, in which the PSF is arranged for respective points of the restored image, and is a matrix having a size of $((M_1 \times M_2) \times (M_1 \times M_2))$. Further, n denotes the noise.

The blur correction performed by the blur correcting unit 12 is to select the restored image so that the square error between an image obtained by degrading the restored image and the input image becomes the smallest, and it can be formulated as a least square problem expressed by the following equation (3).

$$\min_x E(x) = \|y - Hx\|_{L_2}^2 \quad (3)$$

where $\|\ \|_{L2}$ is L2-norm. Further, the equation (3) can be rewritten as follows.

$$\min_x E(x) = (y - Hx)^T (y - Hx) \quad (4)$$

where $x^T$ denotes a transposition of x. When the degradation process is given by solving the equation (4), the restored image, which is considered to be closest to the input image, can be obtained. An optimality requirement of the equation (4) is expressed by the equation (5) obtained by differentiating equation (4) with respect to x.

$$\nabla E = -H^T(y - Hx) = 0 \quad (5)$$

Equation (6) is obtained by solving the equation (5) with respect to x. The equation (6) is an equation of the generalized inverse filter. When a gradient method is constituted with respect to the equation (5), equation (7) can be obtained.

$$x = (H^T H)^{-1} H^T y \quad (6)$$

$$\frac{\partial x}{\partial t} = -\nabla E = H^T(y - Hx) \quad (7)$$

When the equation (7) is discretized, equations (8) and (9), which are equations according to the Richardson-Lucy method, can be obtained.

$$x^{(n+1)} = x^{(n)} + \alpha H^T(y - Hx^{(n)}) \quad (8)$$

$$x^{(0)} = y \quad (9)$$

In the equations (8) and (9), superiors denote the number of iterations (hereinafter, "iterations"), and $\alpha > 0$ denotes a step size. The equations (8) and (9) are referred to as an iteration expression according to the Richardson-Lucy method. The equations (8) and (9) are the same as the equation (74) on page 867 of J. Biemond, R. L. Lagendijk, R. M. Mersereau, "Iterative methods for image deblurring", Proceedings of the IEEE, Volume 78, Issue 5, Page(s): 856-883, May 1990.

The generalized inverse filter directly obtains x satisfying the optimality requirement by calculating the inverse matrix. On the other hand, according to the Richardson-Lucy method, x satisfying the optimality requirement by assuming the input image as the initial solution to consecutively update the solution by an iterative method and repeating this.

The processing for obtaining the restored image by the generalized inverse filter can obtain an ideal restored image by one processing if there is no noise; however, when there is a noise, the noise is diffused to the restored image, and a desired image cannot be obtained.

On the other hand, according to the Richardson-Lucy method, because the iteration can be stopped in the middle of operation, it is possible to prevent the noise diffusing to the restored image. Therefore, a desired image to which the noise is not diffused can be obtained, although it is a partial restoration, not a complete restoration. However, there is a problem that the calculation amount increases because a restoration process is essential.

In the present embodiment, the equations (8) and (9) are recurrently expanded regarding to the initial solution $x^{(0)} = y$, thereby obtaining a relational expression between a solution $x^{(n)}$ and an input image y at one or more predetermined iterations.

A filtering coefficient is derived by actually performing expansion. When n=1, the following equation (10), which is the relational expression with the input image y is derived from the equations (8) and (9).

$$x^{(1)} = x^{(0)} + \alpha H^T(y - Hx^{(0)}) \quad (10)$$
$$= y + \alpha H^T y - \alpha H^T Hy$$
$$= (I + \alpha H^T - \alpha H^T H)y$$

where I denotes a unit matrix.

Next, with regard to n=2 and n=3, the following equations (11) and (12) are obtained respectively similar to the above.

$$x^{(2)} = x^{(1)} + \alpha H^T(y - Hx^{(1)}) \quad (11)$$
$$= (I + \alpha H^T - \alpha H^T H)y + \alpha H^T y -$$
$$\alpha H^T H(I + \alpha H^T - \alpha H^T H)y$$
$$= (I + 2\alpha H^T - 2\alpha H^T H - \alpha^2 H^T HH^T + \alpha^2 H^T HH^T H)y$$

$$x^{(3)} = x^{(2)} + \alpha H^T(y - Hx^{(2)}) \quad (12)$$
$$= (I + 2\alpha H^T - 2\alpha H^T H - \alpha^2 H^T HH^T +$$
$$\alpha^2 H^T HH^T H)y + \alpha H^T y -$$
$$\alpha H^T H(I + 2\alpha H^T - 2\alpha H^T H - \alpha^2 H^T HH^T +$$
$$\alpha^2 H^T HH^T H)y$$
$$= \begin{pmatrix} I + 3\alpha H^T - 3\alpha H^T H - 3\alpha^2 H^T HH^T + 3\alpha^2 H^T HH^T H + \\ \alpha^3 H^T HH^T HH^T - \alpha^3 H^T HH^T HH^T H \end{pmatrix} y$$

With regard to n=4 and thereafter, the relational expression between the restored image $x^{(n)}$ and the input image y at predetermined iterations n can be derived by the similar recurrent expansion.

Because these relational expressions can be uniquely determined when the point response function is determined, these can be calculated beforehand. That is, when the relational expression is calculated for the input image y, solution $x^{(n)}$ at arbitrary iterations can be calculated by one processing. The calculation of the input image y and these relational expressions can be formulated as filtering. The filter coefficient corresponding to the relational expression at arbitrary iterations is stored in a lookup table (hereinafter, "LUT"), the image restoration by the Richardson-Lucy method can be realized as a filtering operation with respect to the input image y. Because image restoration at arbitrary iterations can be realized by one filtering process, a large calculation-amount reduction effect can be expected.

There is regularity in these relational expressions, and these relational expressions can be formulated as shown in the following equation (13) according to a binomial theorem.

$$x^{(n)} = \left( I + \sum_{r=1}^{r \leq n} (-1)^{r-1} \alpha^r \frac{n!}{r!(n-r)!} (H^{[2r-1]} - H^{[2r]}) \right) y \equiv X^{(n)} y \quad (13)$$

$$H^{[r]} = \prod_{j=1}^{j \leq r} \begin{cases} H^T & \text{if } j \text{ is odd} \\ H & \text{if } j \text{ is even} \end{cases}$$

$X^{(n)}$ is designated as a restoration matrix. Because $X^{(n)}y$ is one convolution process, processing of n iterations can be performed by one processing. However, the restoration matrix $X^{(n)}$ is a matrix of $((M_1 \times M_2) \times (M_1 \times M_2))$, and a convolution operation for processing one pixel in $X^{(n)}$ becomes $(M_1 \times M_2)$ product-sum operations, that is, the product-sum operation for a whole screen. This is a considerably large calculation amount.

In the present embodiment, the processing according to the equation (13) is developed from processing for the whole screen to local processing. By developing the processing in this manner, convolution for the whole screen is changed to convolution of a local area, thereby enabling to realize local filtering.

An input image in a local rectangular area (hereinafter, "local kernel") centering on an arbitrary pixel position $(i, j)^T$ is arranged as a column vector, which is designated as $y_1$. For example, if pixel values in a horizontal direction of the image are shifted by one pixel each in a vertical direction in the local kernel and connected sequentially, the image can be expressed by the column vector. Likewise, the restored image in the local kernel at the pixel position $(i, j)^T$ is designated as $x_1^{(n)}$. Likewise, the point response function generated in the local kernel at the pixel position $(i, j)^T$ is designated as $H_i$. The local kernel is a square area having, for example, a size of $((2L+1), (2L+1))$.

At this time, $y_1$ and $x_1^{(n)}$ are column vectors of $((2L+1)*(2L+1))$, and $H_i$ is a matrix of $((2L+1)*(2L+1) \times (2L+1)*(2L+1))$. The restoration matrix of the local kernel at the pixel position $(i, j)^T$ becomes as shown by the following equation (14).

$$x_i^{(n)} = \left( I + \sum_{r=1}^{r \leq n} (-1)^{r-1} \alpha^r \frac{n!}{r!(n-r)!} (H_i^{[2r-1]} - H_i^{[2r]}) \right) y_i \equiv X_i^{(n)} y_i \quad (14)$$

$$H_i^{[r]} = \prod_{j=1}^{j \leq r} \begin{cases} H_i^T & \text{if } j \text{ is odd} \\ H_i & \text{if } j \text{ is even} \end{cases}$$

Further, when filtering is performed with respect to the restored pixel $x_1^{(n)}$ at the pixel position $(i, j)^T$, the whole restoration matrix $X_1^{(n)}$ is not required, and only a portion corresponding to the restored pixel $x_1^{(n)}$, that is, data of the L+1th line in the restoration matrix $X_1^{(n)}$ is required. A matrix obtained by extracting the data of the L+1th line in the restoration matrix $X_1^{(n)}$ and rearranging it in the same manner as the pixel arrangement of the original local kernel is designated as $w_1^{(n)}$, which is used as a restoration filter coefficient.

When the restoration filter coefficient is used, restoration filtering becomes as shown by the following equation (15).

$$x_i^{(n)} = w_i^{(n)} ** y_i \quad (15)$$

where $y_1$ denotes an input pixel at the pixel position $(i, j)^T$, and ** denotes the convolution operation using the filter coefficient $w_1^{(n)}$ with respect to the local kernel.

Figure 3:
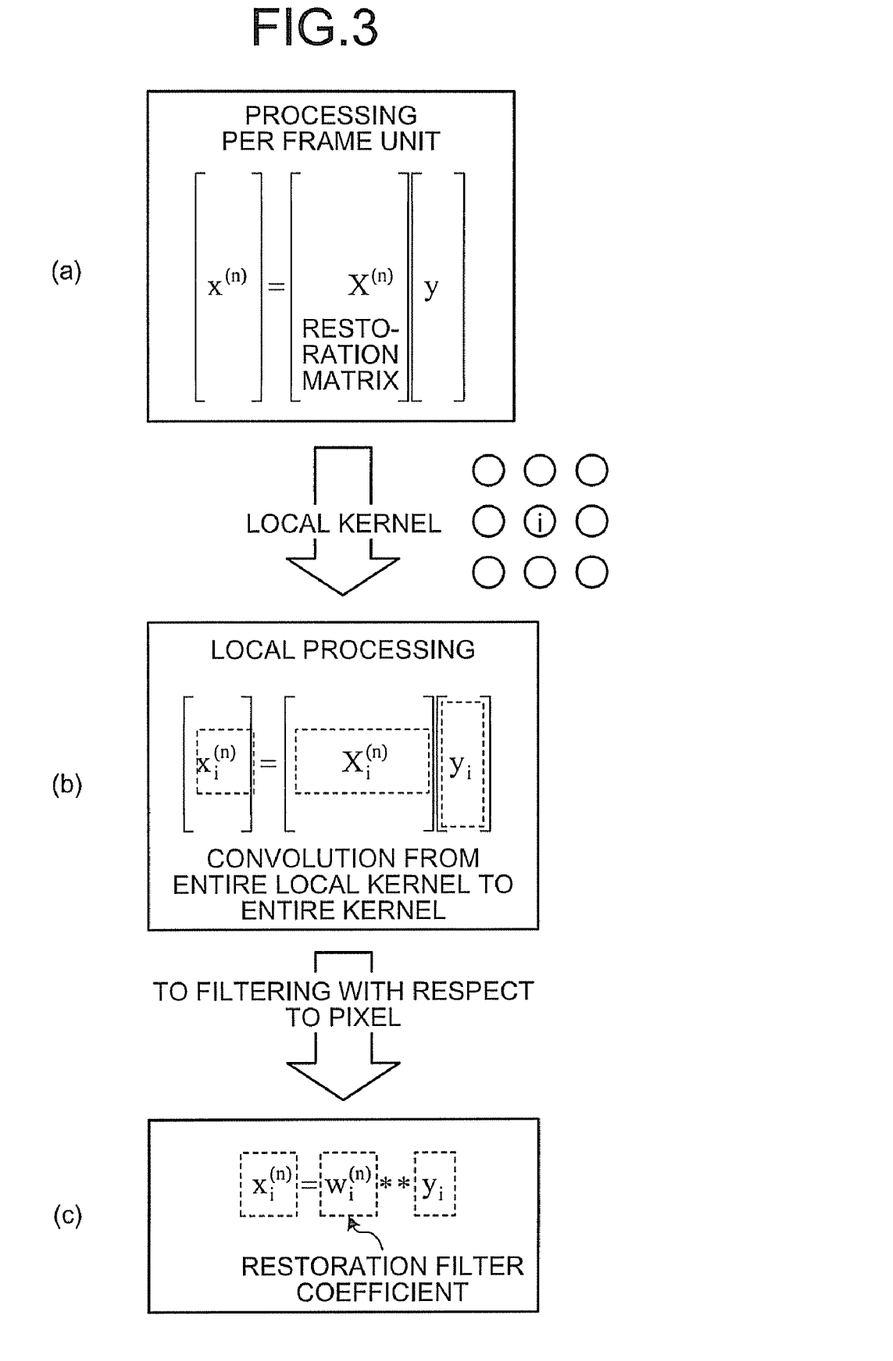
FIG. 3 is an explanatory diagram of restoration filtering corresponding to a local kernel.

FIG. 3 is an explanatory diagram of the restoration matrix corresponding to the local kernel. FIG. 3(a) is an explanatory diagram of the processing for the whole screen, indicating the matrix operation shown in the equation (14). In the figure, "screen" is written as "frame".

FIG. 3(b) is an explanatory diagram of the restoration matrix corresponding to the local kernel. In FIG. 3(b), a restoration matrix including the data of the L+1th line in the restoration matrix $X_1^{(n)}$ corresponding to the restored pixel $x_1^{(n)}$ in FIG. 3(a) is shown. FIG. 3(c) corresponds to the equation (15), in which the matrix operation in FIG. 3(b) is written as the filtering process for each restored pixel.

Figure 4:
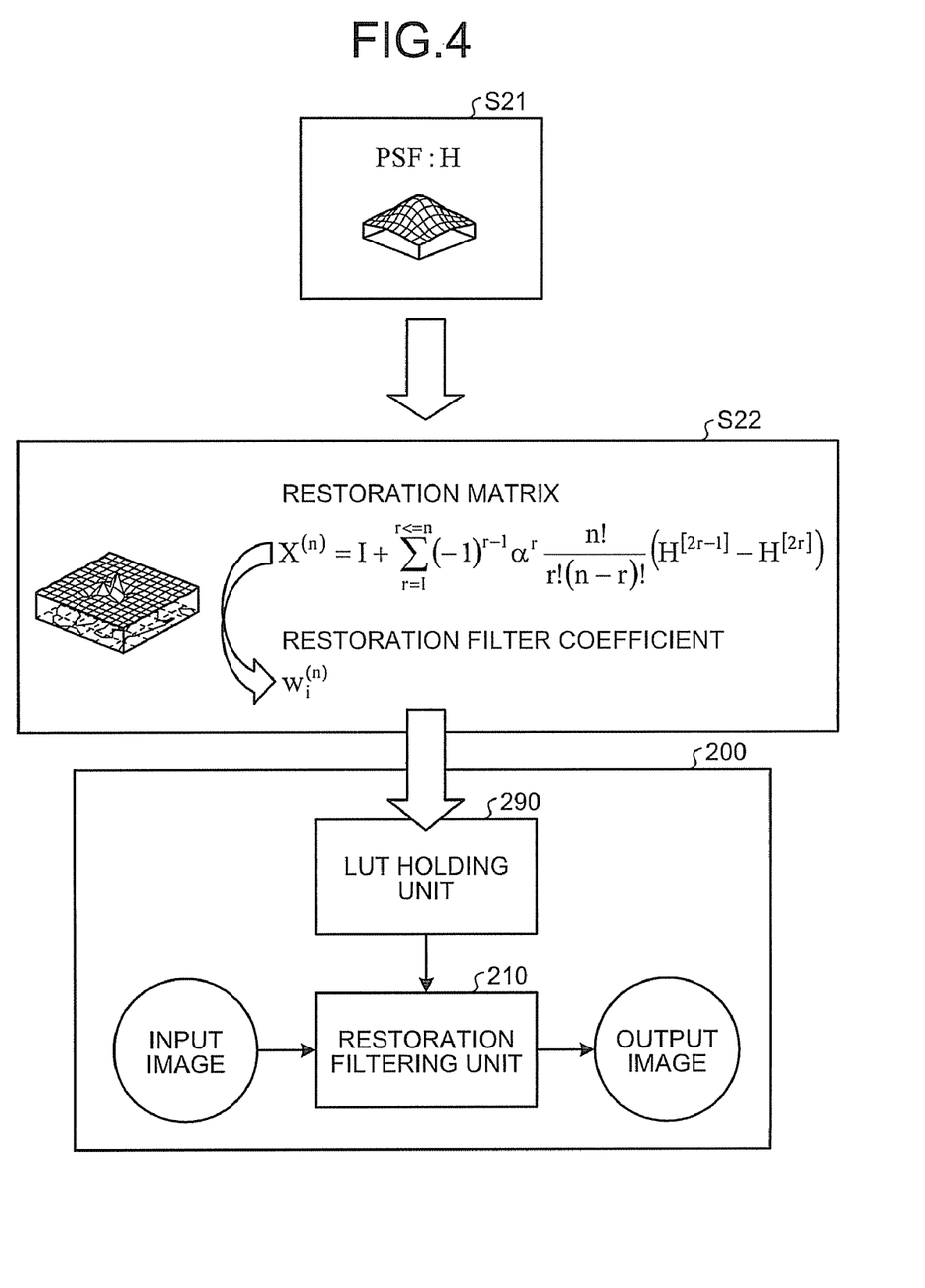
FIG. 4 is a block diagram of a functional configuration of an apparatus, in which a restoration filter coefficient is stored in a LUT.

FIG. 4 is a block diagram of the apparatus, in which the restoration filter coefficient obtained from the restoration matrix according to the equation (13) is stored in the LUT.

The degraded-image restoring apparatus in FIG. 4 has a restoration filtering unit 210 and an LUT holding unit 290.

The restoration filtering unit 210 uses the restoration filter coefficient stored in the LUT holding unit 290 with respect to the input image, to perform restoration of the degraded image. The LUT holding unit 290 holds the restoration filter coefficient at predetermined iterations.

As shown in FIG. 4, Step S21 is a process of degrading the image with respect to a predetermined input image by the blur reproducing unit 11. Step S22 is a process of generating the restoration matrix and the restoration filter coefficient at predetermined iterations with respect to the degraded image at Step S21. Because the processes at Step S21 and Step S22 are performed prior to the restoration of the input image, the restoration filter coefficient to be held in the LUT holding unit 290 is obtained and held therein.

Figure 5:
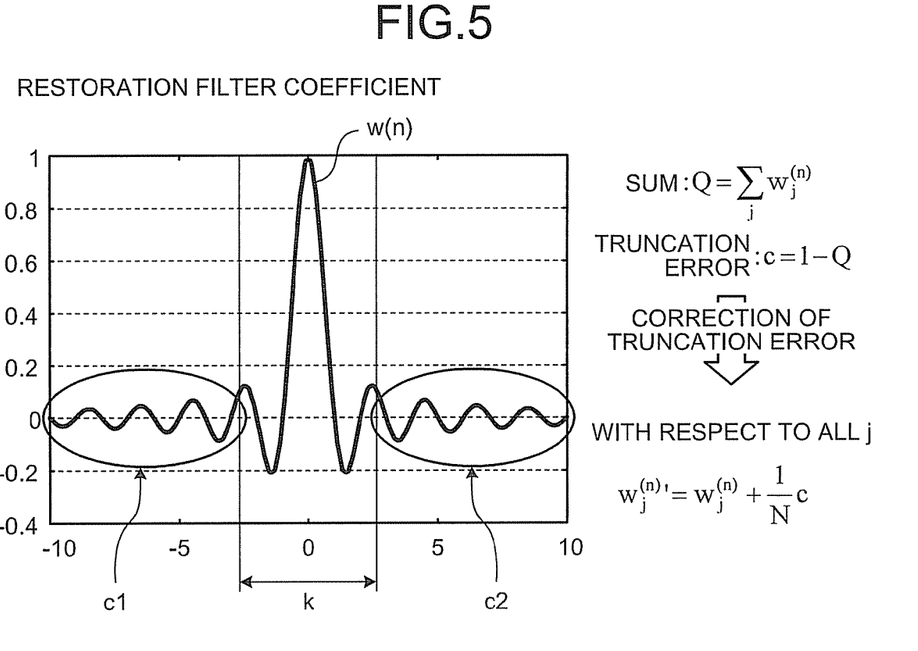
FIG. 5 is an explanatory diagram of correction of a truncation error.

In FIG. 5, when the filtering processing is performed by using a portion corresponding to a local kernel k, of the restoration filter coefficient w truncation errors c1 and c2 occur. More specifically, amplitude components in an area off a center, originally held in the restoration matrix in entire image processing, are left as the truncation errors c1 and c2 by limiting the area to the local kernel. If the truncation errors c1 and c2 are left, a sum total of the filter coefficient does not become 1, and a filtering result deviates.

Therefore, if a sum of the restoration filter coefficient $w_i^{(n)}$ is Q, the truncation error c is expressed by c=1−Q, and as shown by the following equation (16). Correction of the restoration filter coefficient using the truncation error c is expressed by, for example, the following equation (17).

$$c = 1 - \sum w_i^{(n)} \qquad (16)$$

$$\omega'_j = \omega_j + \frac{1}{(2L+1)^2} c \qquad (17)$$

$\omega_j$ is the j-th element of the restoration filter coefficient $w_i^{(n)}$. The correction of the restoration filter coefficient can be performed by applying a truncation-error correction coefficient corresponding to the whole local kernel, with respect to the restoration filter coefficient having the largest amplitude, in addition to the correction with respect to all the elements of the restoration filter coefficient as shown in the equation (17).

Filtering by the restoration filter coefficient $w_i^{(n)}$, with the truncation error being corrected, with respect to an input image $y_1$ in the local kernel is expressed by the following equation (18).

$$x_i^{(n)} = w_i^{(n)'} ** y_i \qquad (18)$$

Figure 6:
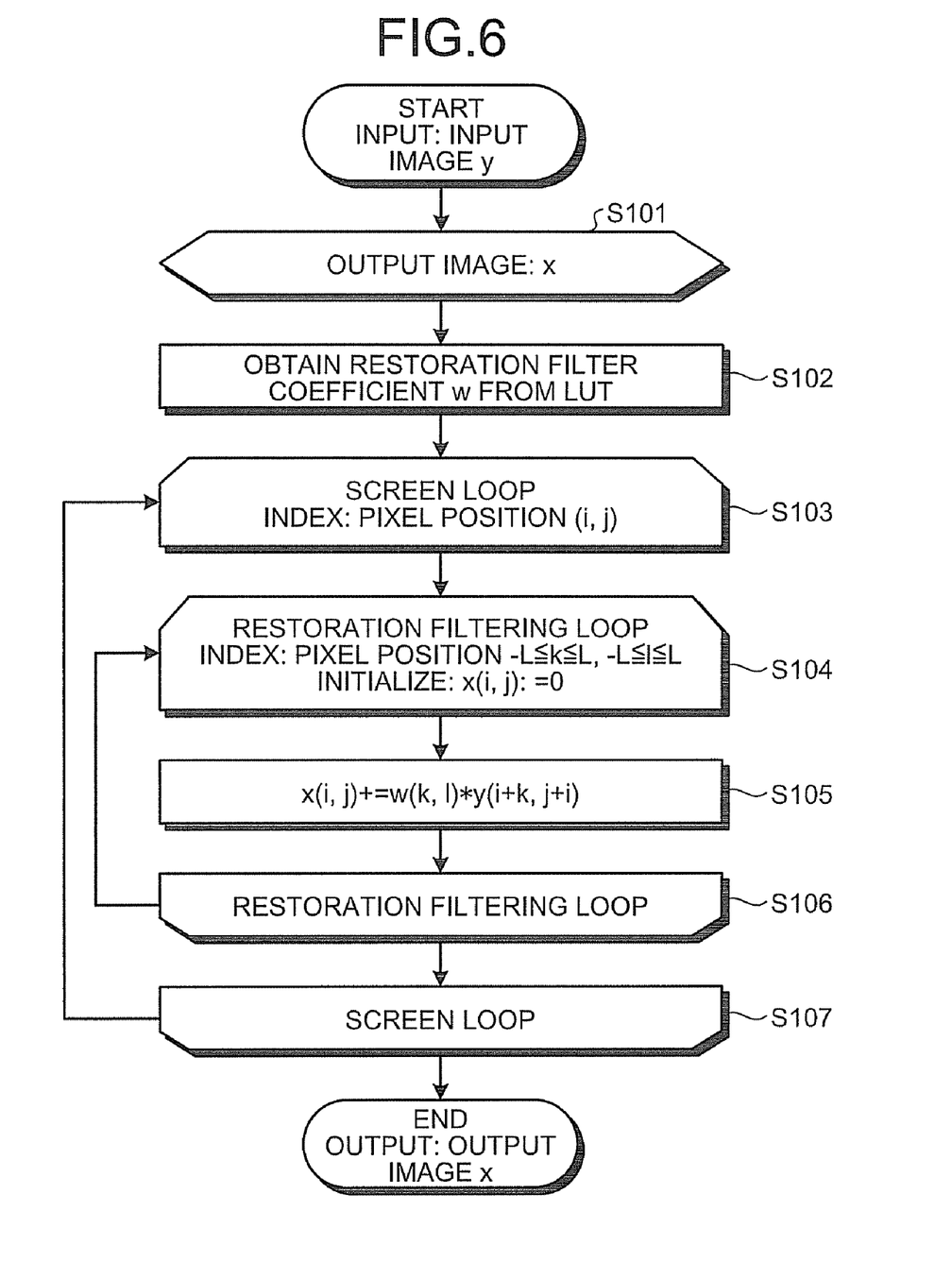
FIG. 6 is a flowchart for explaining details of processing performed by a restoration filtering unit.

FIG. 6 is a flowchart for explaining details of processing performed by the restoration filtering unit 210 in FIG. 4. In FIG. 6, restoration processing is performed with respect to the degraded image y, thereby obtaining an output image x.

In FIG. 6, the input image y is input to the degraded-image restoring apparatus prior to respective processes. At Step S101, a variable x of the output image is defined. For example, a data area corresponding to the output image x is ensured on the memory. Control proceeds to Step S102, where the restoration filter coefficient w is read from the LUT holding unit 290.

At steps S103 to S107, which follow Step S102, the restored image x with respect to the input image y is obtained by the restoration filter coefficient w obtained at Step S102.

At Step S103, which follows Step S102, the restoration process with respect to one screen of the input image is started. A pixel position (i, j) in the screen is initialized here. Subsequently, control proceeds from Step S103 to Step S104, where loop of a restoration filtering process by the local kernel with respect to one pixel is started.

More specifically, for example, a filtering process by the input pixel y is performed in a range of −L≦l≦L in a horizontal direction of the screen and in a range of −L≦l≦L in a vertical direction of the screen, assuming that the radius of the local kernel is L. At Step S104, a value of a central pixel x(i, j) of the local kernel is initialized.

Control proceeds from Step S104 to Step S105, where the restoration filtering process is performed according to the following equation (19). More specifically, a value is calculated by multiplying the respective input images in the local kernel by the restoration filter coefficient, and added to an already calculated value.

$$x(i,j) += w(k,l)*y(i+k,j+i) \qquad (19)$$

Control proceeds from Step S105 to Step S106, where if calculation of the equation (19) is being performed with respect to all input images y in the local kernel, control proceeds to Step S107, and if not, control returns to Step S104 to repeat the process. At Step S107, it is determined whether the restoration process by the local kernel has been performed with respect to all pixels in one screen now being processed. When the restoration process with respect to all the pixels is complete, the process is finished and the output image x is output. On the other hand, when there is a pixel to which the restoration process has not been finished yet, control returns to Step S103 to repeat the process.

In the process from Step S104 to Step S106, when an end of the local kernel is present outside the screen, a pixel value outside the screen can be obtained by a mirroring process with respect to the pixel in the screen, or a predetermined pixel value can be used.

According to the present embodiment, because the image restoration processing at arbitrary iterations can be realized by one filtering process, the calculation amount can be considerably reduced.

In the degraded-image restoring apparatus 200 in FIG. 4, a predetermined number of iteration and restoration processes is equivalently realized by one filtering process. Accordingly, the restoration performance can be increased by less calculation amount.

However, if iterations to be realized equivalently are excessively increased, an influence of noise also increases and a desired restored image may not be obtained. The degraded-image restoring apparatus 300 in FIG. 7 prepares restoration filter coefficients realizing one or more iterations, estimates an amount of noise, and selects any one of the restoration filter coefficients corresponding to the estimated amount of noise, to perform restoration filtering.

Figure 7:
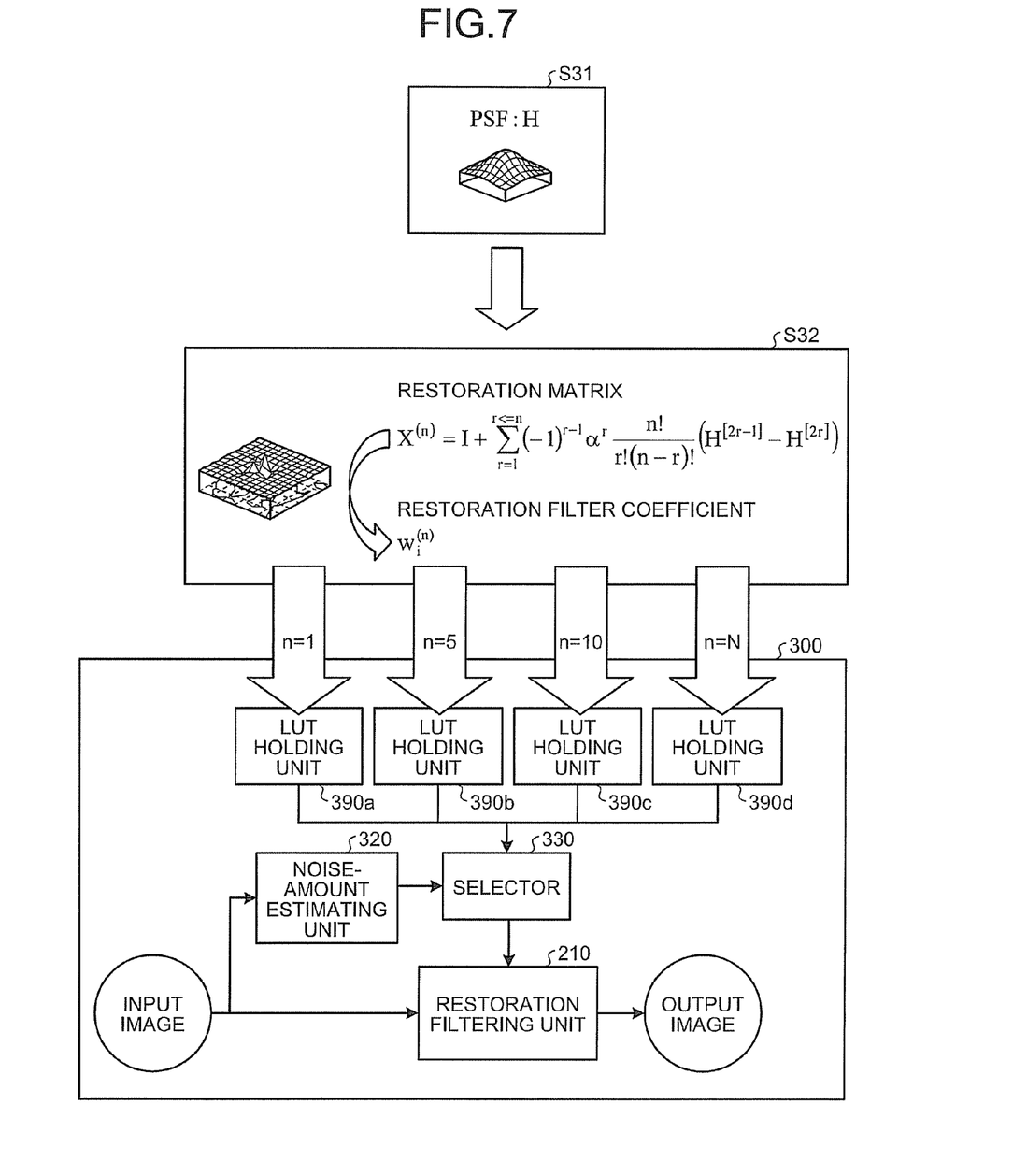
FIG. 7 is an explanatory diagram of a functional configuration of an apparatus that uses a restoration filter coefficient corresponding to one or more iterations.

The degraded-image restoring apparatus 300 includes a restoration filtering unit 310, a noise-amount estimating unit 320, a selector 330, an LUT holding unit 390a, an LUT holding unit 390b, an LUT holding unit 390c, and an LUT holding unit 390d.

The LUT holding units 390a to 390d respectively hold a restoration filter coefficient corresponding to different iterations. In FIG. 7, n=1, 5, 10, and N are respectively designated as iterations of the restoration filter coefficients held by the LUT holding units 390a to 390d.

The noise-amount estimating unit 320 estimates the amount of noise of the degraded input image for each rectangular area corresponding to the local kernel. The selector 330 obtains the restoration filter coefficient from one LUT holding unit of the LUT holding units 390a to 390d based on the amount of noise estimated by the noise-amount estimating unit 320.

More specifically, the LUT holding unit that obtains the restoration filter coefficient is determined as described below. The restoration filter coefficient having the small number of iterations does not largely amplify the noise, although the restoration performance is small. Further, the restoration filter coefficient having the large number of iterations largely amplifies the noise, although the restoration performance is large. Therefore, when the estimated amount of noise is large, the restoration filter having the small number of iterations is selected, and when the estimated amount of noise is small, the restoration filter having the large number of iterations is selected. The value of the amount of noise and the value of iterations can be associated with each other, for example, by designating a plurality of predetermined values of the amount of noise as thresholds. Accordingly, the restoration performance and noise amplification can be balanced.

The restoration filtering unit 310 performs processing using the restoration filter coefficient obtained by the selector 330 with respect to the input image, and outputs an output image.

In FIG. 7, Step S31 is a process of degrading the image with respect to the predetermined input image by the blur reproducing unit 11, and Step S32 is a process of generating the restoration matrix and the restoration filter coefficient at different iterations with respect to the degraded image at Step S31. Because the processes at Step S31 and Step S32 are performed prior to the restoration of the input image, the restoration filter coefficients corresponding to different iterations to be held respectively in the LUT holding units 390a to 390d are obtained.

Figure 8:
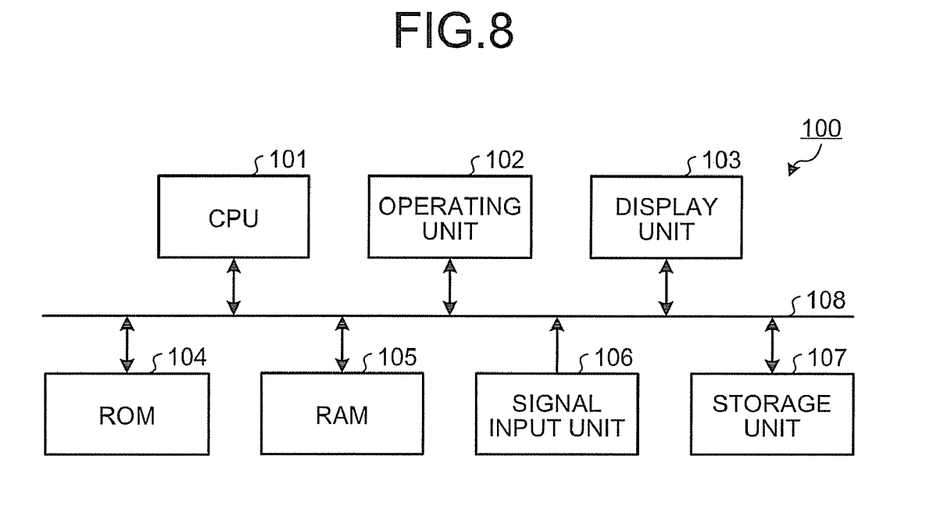
FIG. 8 is a block diagram of a hardware configuration of a degraded-image restoring apparatus.

As shown in FIG. 8, the degraded-image restoring apparatus 100 includes a central processing unit (CPU) 101, an operating unit 102, a display unit 103, a read only memory (ROM) 104, a random access memory (RAM) 105, a signal input unit 106, and a storage unit 107, and the respective units are connected with each other by a bus 108.

The CPU 101 executes various processes in cooperation with various programs stored beforehand in the ROM 104 or the like, using a predetermined area of the RAM 105 as a work area and integrally controls the operation of the respective units constituting the degraded-image restoring apparatus 100. The CPU 101 also executes the degraded-image restoration method according to the present embodiment in cooperation with the program stored beforehand in the ROM 104 or the like.

The operating unit 102 includes various input keys and the like, receives information input from a user as an input signal, and outputs the input signal to the CPU 101.

The display unit 103 includes a display such as a liquid crystal display (LCD) or the like, to display various pieces of information based on the display signal from the CPU 101. The display unit 103 can constitute a touch panel integrally with the operating unit 102.

The ROM 104 stores a program relating to the control of the degraded-image restoring apparatus 100 and various pieces of setting information unrewritably. The RAM 105 is, for example, a memory such as an SDRAM, and functions as a work area of the CPU 101 and plays a role as a buffer or the like.

The signal input unit 106 converts a dynamic image and speech to electric signals, and outputs the electric signals as picture signals to the CPU 101. The signal input unit 106 can use a broadcast program receiver (tuner) or the like.

The storage unit 107 has a magnetically or optically recordable recording medium, and stores data of picture signals obtained via the signal input unit 106 or picture signals input from outside via a communication unit or an interface (I/F) (not shown).

While the best mode for carrying out the invention has been explained above, the present invention is not limited to the embodiment described in the best mode. Various modifications can be made without departing from the scope of the invention.

The degraded-image restoration method, the degraded-image restoring apparatus, and the computer program product according to the present invention reduce a throughput in an apparatus that restores a degraded image to obtain a preferable restored image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A degraded-image restoration method comprising:
   inputting a degraded image degraded by a predetermined degradation process;
   reading from a storage unit a filter coefficient in a filtering process of restoring the degraded image, in which an iteration formula for minimizing a square error between the degraded image and an image obtained by degrading a restored image by the degradation process is expanded corresponding to a predetermined number of iterations; and
   performing the filtering process using the filter coefficient with respect to the degraded image to obtain a restored image of the degraded image.

2. The method according to claim 1, wherein in the filtering process, a local filtering process using a filter coefficient of the filter coefficients corresponding to a local area in the degraded image is performed by a convolution operation for each pixel included in the degraded image for each local area centering on the pixel.

3. The method according to claim 2, wherein the filter coefficient used for the local filtering process is a filter coefficient normalized for each of the local area.

4. The method according to claim 1, wherein
   a filter coefficient corresponding to one predetermined number of iterations is read at the coefficient reading based on a degradation level of the degraded image, when the filter coefficients corresponding to each of the predetermined different number of iterations are held in the storage unit.

5. A degraded-image restoring apparatus comprising:
   an image input unit that inputs a degraded image degraded by a predetermined degradation process;
   a storage unit that stores a filter coefficient in a filtering process of restoring the degraded image, in which an iteration formula for minimizing a square error between the degraded image and an image obtained by degrading a restored image by the degradation process is expanded corresponding to a predetermined number of iterations; and
   a restored-image obtaining unit that obtains the restored image of the degraded image by performing the filtering process using the filter coefficient with respect to the degraded image.

6. A computer program product having a non-transitory computer readable medium including programmed instructions for restoring a degraded image, wherein the instructions, when executed by a computer, cause the computer to perform:

inputting a degraded image degraded by a predetermined degradation process;

reading from a storage unit a filter coefficient in a filtering process of restoring the degraded image, in which an iteration formula for minimizing a square error between the degraded image and an image obtained by degrading a restored image by the degradation process is expanded corresponding to a predetermined number of iterations; and performing the filtering process using the filter coefficient with respect to the degraded image to obtain a restored image of the degraded image.

* * * * *